June 17, 1930.    V. GENKIN    1,764,400
PROTECTIVE SYSTEM
Filed April 28, 1925
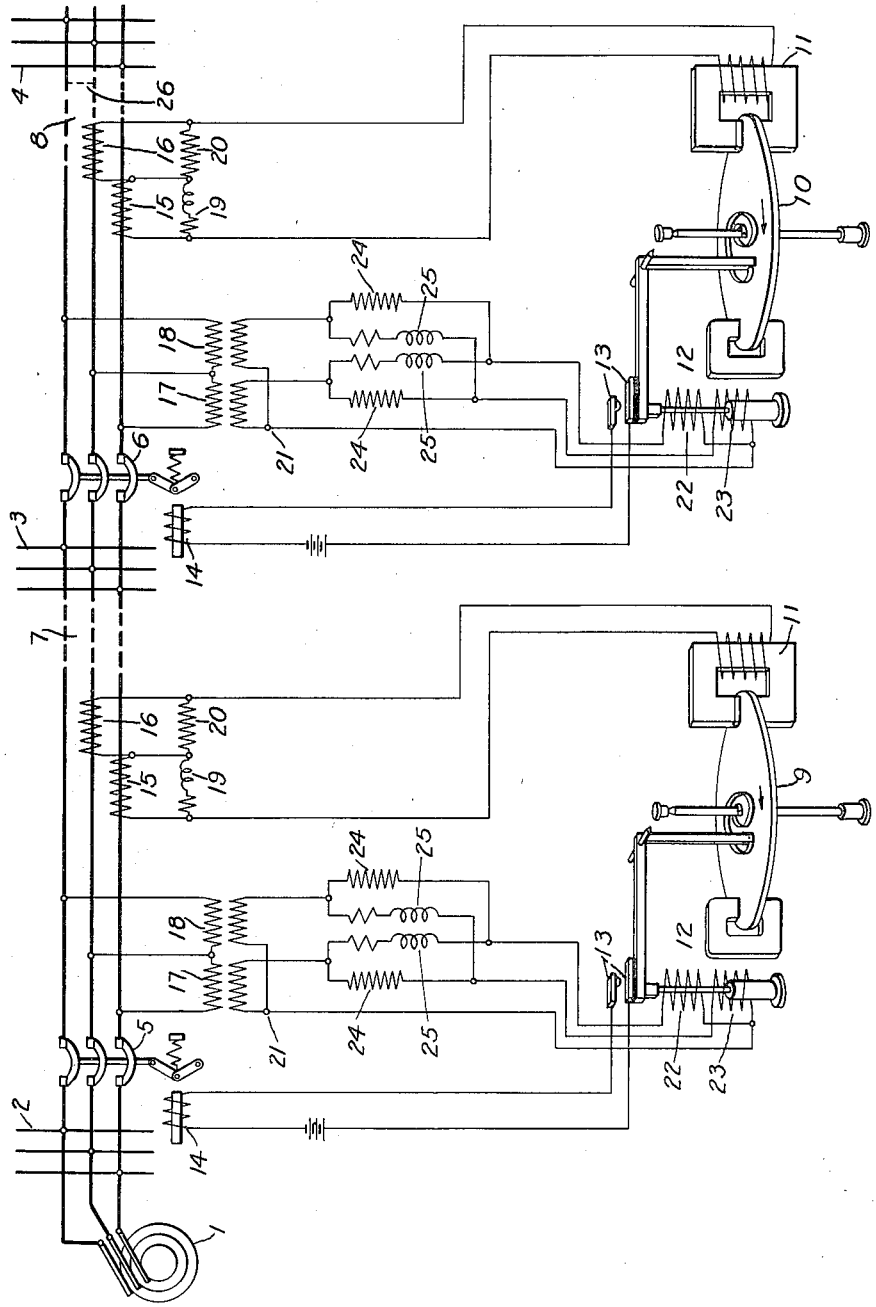
WITNESSES:
Fred C. Williams
E R Evans
INVENTOR
Vladimir Genkin
BY
Chesley G. Carr
ATTORNEY Patented June 17, 1930

1,764,400

UNITED STATES PATENT OFFICE

VLADIMIR GENKIN, OF MARSEILLE, FRANCE

PROTECTIVE SYSTEM

Application filed April 28, 1925. Serial No. 26,328.

My invention relates to electrical protective systems and particularly to systems utilizing time-element relays the operation of which is dependent upon the distance between the relay and a fault in an electrical circuit.

One object of my invention is to provide a relay protective system in which selective operation of the relays in case a fault occurs is obtained in accordance with the symmetrical components of the unbalanced currents and voltages of the distribution system.

Another object of my invention is to provide an impedance relay for a polyphase distribution system that operates in accordance with the distance and severity of a fault irrespective of the phase or phases affected thereby.

Another object of my invention is to provide a relay having an actuating member or winding for operating the relay in accordance with the current traversing an associated circuit and a restraining member or so-called restraining winding for controlling the time of operation of the relay in accordance with the positive phase-sequence component or the difference between the positive and the negative phase-sequence components of the voltages obtaining on the circuit during the abnormal condition. The actuating winding is preferably so connected to the circuit that the operation of the relay is independent of the phase or phases involved in a short-circuit or other fault.

For the protection of electrical transmission circuits against short-circuits or grounds, it has been proposed to use impedance relays comprising an actuating winding energized in accordance with the current traversing the circuit and a restraining winding energized in accordance with the voltage obtaining on the circuit. In the event of an excessive flow of current caused by a short-circuit or grounded conductor, the impedance relay is operatively energized.

In a distribution system embodying a plurality of circuit-interrupters controlled by such impedance relays, selective operation of the interrupters to disconnect only the faulty section is obtained because of the characteristics of the relay. Since the time of operation of the relay is inversely proportional to the current flowing and directly proportional to the voltage existing during the abnormal condition, it is approximately proportional to the impedance of the circuit between the relay and the fault. Therefore, the relays nearest the fault operate first.

A relay protective system for polyphase circuits embodying my invention comprises impedance relays and means interposed between each relay and the circuit whereby the actuating winding is energized in accordance with the positive phase-sequence component of the currents traversing the circuit and the restraining member or winding is energized in accordance with the difference between the positive and the negative phase-sequence components of the voltages of the circuit. The operation of the relay is independent of the phase or phases affected by the fault and, therefore, a relay in each phase is not required. Furthermore, the sensitivity of the relay is increased, since the difference between the positive and the negative phase-sequence components of voltage is zero at the point of failure in the case of either a single-phase or a three-phase short-circuit. Therefore, the restraining winding of a relay near the point of fault is practically de-energized and the relay is substantially instantaneous in its operation.

For a better understanding of my invention, reference may be had to the accompanying drawings, the single figure of which is a diagrammatic view of an electrical distribution system embodying my invention.

Referring to the drawing, the system comprises a three-phase generator 1 connected to the bus sections 2, 3 and 4 of a plurality of stations. The bus sections 3 and 4 are connected to the generator 1 through circuit interrupters 5 and 6 and transmission circuits 7 and 8. Relays 9 and 10 are connected to the transmission circuits 7 and 8 to disconnect the same in case of a fault. Each of the relays 9 and 10 comprises a current-actuating winding 11, a voltage restraining member 12 and contact members 13 controlling the circuits of the trip coils 14 of the circuit interrupters 5 and 6. The detailed construction of the relays 9 and 10 may be similar to that shown in the patent to L. N. Crichton, No. 1,686,653, assigned to the Westinghouse Electric & Mfg. Company.

The current and voltage windings of the relays 9 and 10 are connected to the associated transmission circuits by means of two current transformers 15 and 16 and two voltage transformers 17 and 18. Inasmuch as the connections of the windings of the two relays are similar, a detailed description of one of them is sufficient.

The secondary windings of the current transformers 15 and 16 are connected in series, and impedance devices 19 and 20 are bridged across each of the secondary windings. The outside terminals of the secondary windings of the current transformers 15 and 16 are connected to the winding 11 of the relay. The impedance devices 19 and 20 have the same absolute values but have different phase characteristics. For the case of a three-phase circuit, such as that illustrated in the drawing, one impedance device may be a resistor and the other a combined resistor and reactor, the combined phase angle of which differs substantially 60° from that of the other impedance device 20. Since in a balanced system, the currents traversing the current transformers 15 and 16 are 120° out of phase, the voltages across the impedance devices 19 and 20 are 60° or 180° out of phase, under balanced conditions, depending upon the rotation of phases in the circuit. Since it is desired to energize the current winding 11 in accordance with the positive phase-sequence component of the currents traversing the circuit, the current transformers 15 and 16 and the impedance devices 19 and 20 are so connected that the voltages across the impedance devices are 60° out-of-phase under balanced conditions.

For two-phase or six-phase distribution systems, the phase characteristics of the impedance devices 19 and 20 differ in an obvious degree that is correlated to the phase displacement of the currents traversing the conductors of the circuit.

The primary windings of the voltage transformers 17 and 18 are connected in series and the secondary windings are similarly connected except that one of the windings is reversed. The common terminal 21 of the secondary windings is connected to each of the two opposing portions 22 and 23 of the voltage member 12 of the relay. The other terminals of the secondary windings of the voltage transformers 17 and 18 each contain two equal impedance devices of unlike phase characteristics. A resistor 24 is inserted in series with each secondary winding and the upper terminals of the windings 22 and 23 and a reactive impedance device 25 is inserted in series with each secondary winding and the other of the windings 22 and 23. The impedance devices 24 and 25 are of equal value and, in the case of a three-phase circuit, differ in phase by 60° so that the current traversing each impedance device is exactly 60°(120−60) or 180°(120+60) out of phase with the current traversing the other associated impedance device connected to the same winding 22 or 23.

The two opposing windings or portions 22 and 23 of the voltage-restraining member 12 are preferably associated with separate magnets or separate magnetic circuits so that the portions 22 and 23 may not react magnetically with each other and yet may oppose each other mechanically either on the same spindle, as shown in the drawing, or on two adjacent separate spindles (not shown).

With the connections shown, one of the windings 22 or 23 is traversed by a current proportional to the positive phase-sequence component of the voltages obtaining on the circuit 7 and the other by a current proportional to the negative phase-sequence component. Accordingly, the resultant energization of the voltage member 12 of the relay is proportional to the difference between the positive and the negative phase-sequence components of voltage.

For a distribution system having a different number of phases, the phase characteristics of the impedance devices 24 and 25 are changed to a degree that is correlated to the number of phases in order to obtain currents proportional to the positive and the negative phase-sequence components of voltage.

When a fault occurs in the distribution system, such as a short-circuit, as indicated at 26, the excessive current flow to the fault causes the operative energization of relays 9 and 10. Since the actuating winding 11 of each relay is energized in accordance with the positive phase-sequence component of the currents traversing the distribution circuit, the operation of the relay is the same, irrespective of the phases affected by the short-circuit.

The time of operation of each relay 9 and 10 when energized by the same value of current, depends upon the energization of the voltage restraining member 12. For a single-phase short-circuit in a transmission circuit, the positive and negative phase-sequence components of voltage are equal at the point of short-circuit. The positive component increases in accordance with the distance from the short-circuit and the negative component, on the other hand, decreases in accordance with the distance from the short-circuit. Accordingly, the relay 10, which is nearest the short-circuit, will operate more quickly than the relay 9 since the voltage member 12 of relay 10 is substantially deenergized, whereas, the voltage member 12 of relay 9, being much nearer the generator, is energized sufficiently to retard the operation of the relay.

The fact that the relative magnitudes of the positive and negative phase-sequence components vary as stated may be demonstrated mathematically, but it is sufficient for the purposes of this application to point out that the fact that the positive component increases as the generator is approached may be deduced from the fact that the impedances of the line conductors tend to balance the phase voltages. Therefore, since the voltages are unbalanced to a greater degree near the fault, it is obvious that the negative phase-sequence component is a maximum and the positive phase-sequence component is a minimum at this point.

In the case of a three-phase short-circuit, the currents and voltages remain balanced. There is no negative phase-sequence component of voltage therefore and the positive phase-sequence component of voltage varies from zero at the short-circuit to a maximum at the generator. Accordingly, the energization of the voltage restraining coils 12 of the relays varies in accordance with the distance from the short-circuit and selective operation is obtained. The case of a grounded conductor is similar to that of a single-phase short circuit.

I do not consider that my invention is limited to the precise arrangement shown and described, particularly with reference to the details of construction of the impedance relays. Furthermore, while I consider that it is preferable to energize the restraining coil of the relay in accordance with the difference between the positive and the negative phase sequence components, it is obvious that it may be energized in accordance with positive phase-sequence components alone, as this quantity is a minimum at the point of short-circuit.

Although I have shown an embodiment of my invention, in order that it may be readily understood, I do not wish to be limited thereto, as various modifications may be made therein without departing from the spirit and scope of my invention, as set forth in the appended claims.

I claim as my invention:

1. An electrical system comprising a polyphase circuit, a circuit-interrupter therein, a relay having actuating and restraining members responsive to the circuit conditions and a contact member upon which said members act in opposition for controlling said interrupter upon the occurrence of a fault and means responsive to phase-sequence currents interposed between the actuating member and the circuit whereby the degree of energization of said member is independent of the particular phase or phases affected by the fault.

2. An electrical system comprising a polyphase circuit, a circuit-interrupter therein, a relay for controlling said interrupter upon the occurrence of a fault, an actuating member for the relay connected to the circuit, a restraining member for controlling the selective time of operation of the relay and means connected between said restraining member and the circuit for segregating the positive and negative phase-sequence components of an electrical quantity of the circuit.

3. An electrical system comprising a polyphase circuit, a circuit-interrupter therein, a relay for controlling said interrupter upon the occurrence of a fault, an actuating winding for the relay connected to the circuit, restraining windings for controlling the selective time of operation of the relay and means for energizing said restraining windings in accordance with the difference between the positive and the negative phase-sequence components of an electrical quantity of the circuit.

4. An electrical system comprising a polyphase circuit, a circuit-interrupter therein, a relay for controlling said interrupter upon the occurrence of a fault, a current actuating winding for the relay connected to the circuit, a voltage restraining member for the relay and means including a resistor and a reactor connected between the restraining member and the circuit for segregating the positive and negative phase-sequence components of the voltages of the circuit.

5. An electrical system comprising a polyphase circuit, a circuit-interrupter therein, a relay for controlling said interrupter upon the occurrence of a fault, an actuating winding for the relay connected to the circuit, a voltage restraining member for the relay and means for energizing said restraining member in accordance with the difference between the positive and the negative phase-sequence components of the voltages of the circuit.

6. In combination, a polyphase circuit, an electro-responsive device having mechanically coacting current responsive and voltage responsive members and means for energizing said windings in accordance with the positive phase-sequence component of the currents and the difference between the positive and the negative phase-sequence components of the voltages in the circuit respectively.

7. In combination, a polyphase circuit, a single time-element device having mechanically co-acting actuating and restraining members and means connected between the windings of said members and the circuit for segregating the positive and negative phase-sequence components of the currents and voltages in said circuit.

8. An electrical system comprising a plurality of transmission circuits in series relation, circuit-interrupters therein, single relays controlling said interrupters each having a current actuated member and a voltage restraining member connected to one of said transmission circuits and means connected between each of said restraining members and the associated circuit for segregating the positive and negative phase-sequence components of the voltages.

9. An electrical system comprising a plurality of transmission circuits in series relation, circuit-interrupters therein, relays controlling said interrupters each having an actuating winding and a restraining member, means for energizing each of said actuating windings in accordance with the positive phase-sequence component of the currents traversing the associated circuit and means for energizing each of said restraining members in accordance with the difference between the positive and the negative phase-sequence components of the voltages of the associated circuit.

10. The combination with a polyphase circuit and a circuit-interrupter therefor responsive to a fault, of interrupter-control means including a time-element-impedance-distance relay having an actuating member responsive to phase-sequence currents and a mechanically co-acting restraining member responsive to phase-sequence voltages and having an effectiveness dependent upon the distance of the relay from the fault and upon the severity of the fault and independent of the phase or phases affected by the fault.

11. The combination with a polyphase circuit and a circuit-interrupter therefor responsive to a circuit fault, of interrupter-control means including means for obtaining symmetrical phase-sequence components of voltage and current from the circuit, and a single current-actuated voltage-restrained relay responsive to said components.

12. The combination with a polyphase circuit divided into sections to be protected against faults, and circuit interrupters for isolating the sections, of means for obtaining symmetrical phase-sequence quantities from the circuit, and a single relay for controlling each interrupter responsive to said phase-sequence quantities and having mechanically co-acting current-actuating and voltage-restraining members effective as to time-selectivity in accordance with the distance of the fault from the relay.

13. In a protective system for a polyphase circuit, said circuit including a plurality of sections and circuit interrupters therefor, means for selectively disconnecting said sections from said circuit, said means including a plurality of relays having actuating and restraining windings associated with said circuit and means interposed between said relays and said circuit whereby the degree of energization of the said windings of the said relays is independent of the phases of the circuit affected by a fault.

14. The combination, in a protective system for a sectionalized polyphase circuit and circuit interrupters therefor, of a plurality of time-element-impedance relays responsive to conditions of unbalance occurring on said circuit as a result of fault conditions and means interposed between said relays and said circuit whereby the degree of energization of said relays is independent of the phases of the circuit affected by the said fault.

15. The combination with a polyphase circuit to be protected and a circuit interrupter therefor, of means for detecting the phase unbalance occurring in said circuit and a relay means for controlling said interrupter responsive to said unbalance, said relay means having actuating and restraining members energized from said first means and effective as to time-selectivity in accordance with the distance of the fault from the relay means.

16. An electrical system comprising a polyphase circuit, a circuit-interrupter therein, a relay for controlling said interrupter upon the occurrence of a fault, said relay including an actuating winding energized in accordance with the rotational components of an electrical quantity of said circuit, a restraining member for the relay and means for energizing said restraining member in accordance with the rotational components of another electrical quantity of said circuit, said relay having an effectiveness dependent upon the distance of the relay from the fault and independent of the phase or phases affected by the fault.

In testimony whereof, I have hereunto subscribed my name this tenth day of April 1925.

VLADIMIR GENKIN.